(12) United States Patent
Ball et al.

(10) Patent No.: US 8,031,891 B2
(45) Date of Patent: Oct. 4, 2011

(54) DYNAMIC MEDIA RENDERING

(75) Inventors: Steven J. Ball, Seattle, WA (US); Stephen C. Rowe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1504 days.

(21) Appl. No.: 11/170,844

(22) Filed: Jun. 30, 2005

(65) Prior Publication Data

US 2007/0011196 A1   Jan. 11, 2007

(51) Int. Cl.
H04R 5/02 (2006.01)
(52) U.S. Cl. ........................................................ 381/303
(58) Field of Classification Search .................. 707/791, 707/793, 794; 381/303
See application file for complete search history.

(56) References Cited

U.S. PATENT DOCUMENTS

| | | | |
|---|---|---|---|
| 5,068,897 A * | 11/1991 | Yamato et al. .................. 381/302 |
| 6,243,476 B1 * | 6/2001 | Gardner ......................... 381/303 |
| 6,498,856 B1 * | 12/2002 | Itabashi et al. ................. 381/302 |
| 6,530,083 B1 * | 3/2003 | Liebenow ......................... 725/46 |
| 6,633,648 B1 * | 10/2003 | Bauck ............................. 381/303 |
| 6,839,438 B1 * | 1/2005 | Riegelsberger et al. ........ 381/18 |
| 7,526,093 B2 * | 4/2009 | Devantier et al. ............... 381/59 |
| 7,706,544 B2 * | 4/2010 | Melchior et al. ................. 381/18 |
| 7,734,362 B2 * | 6/2010 | Roeder et al. .................. 700/94 |
| 7,751,915 B2 * | 7/2010 | Roeder et al. .................. 700/94 |
| 7,933,421 B2 * | 4/2011 | Asada ............................. 381/86 |
| 2002/0144259 A1 * | 10/2002 | Gutta et al. ...................... 725/10 |
| 2003/0007648 A1 * | 1/2003 | Currell ............................ 381/61 |
| 2003/0210139 A1 * | 11/2003 | Brooks et al. ................. 340/531 |
| 2005/0081160 A1 * | 4/2005 | Wee et al. ...................... 715/755 |
| 2005/0131580 A1 * | 6/2005 | Kurzweil ....................... 700/245 |
| 2005/0254505 A1 * | 11/2005 | Chang et al. .................. 370/401 |
| 2006/0062410 A1 * | 3/2006 | Kim et al. ...................... 381/310 |
| 2007/0041598 A1 * | 2/2007 | Pfeifer et al. .................. 381/303 |
| 2007/0116306 A1 * | 5/2007 | Riedel et al. .................. 381/303 |
| 2008/0056517 A1 * | 3/2008 | Algazi et al. .................. 381/310 |
| 2008/0232608 A1 * | 9/2008 | Ullmann .......................... 381/77 |
| 2008/0279389 A1 * | 11/2008 | Yoo et al. ........................ 381/18 |

FOREIGN PATENT DOCUMENTS

| | | | |
|---|---|---|---|
| GB | 2203315 A | * | 10/1988 |
| WO | WO 8704799 A1 | * | 8/1987 |
| WO | WO 2005074320 A2 | * | 8/2005 |

OTHER PUBLICATIONS

Cucchiara, Rita, "Multimedia Surveillance Systems," Nov. 11, 2005, ACM, pp. 3-10.*
Koile, Activity Zones for Context-Aware Computing, 2003, Springer, pp. 90-105.*

(Continued)

Primary Examiner — Luke S Wassum (57) ABSTRACT

Media may be dynamically rendered by receiving signals from one or more types of sensors sensing in an area, and obtaining from the signals information about one or more locations of furniture, or one or more locations of persons or heads or ears thereof, or identities of one or more persons in common with other data such as time of day, season, or other external metadata. Audio and/or video data may be rendered based on the locations or identities. The identity of a person can be automatically obtained and used to automatically select a rendering profile which is then used to render digital audio and/or video media. A dynamically changing spatial location of a head and/or or ears may be automatically determined and how an audio stream is rendered may be dynamically changed based on the spatial location.

9 Claims, 10 Drawing Sheets

OTHER PUBLICATIONS

Koile ("Activity Zones for Context-Aware Computing," 2003, Springer, pp. 90-104).*

Chen, G. and D. Kotz "A Survey of Context-Aware Mobile Computing Research", Dartmouth Computer Science Technical Report TR2000-381, 2000.*

Brummitt, B., J. Krumm, B. Meyers and S. Shafer "Ubiquitous Computing and the Role of Geometry", IEEE Personal Communications, Oct. 2000, pp. 41-43.*

Hightower, J. and G. Borriello "A Survey and Taxonomy of Location Systems for Ubiquitous Computing", University of Washington, Department of Computer Science and Engineering, Technical Report UW-CSE-01-08-03, Aug. 24, 2001.*

Hightower, J. and G. Borriello "Location Systems for Ubiquitous Computing", IEEE Computer, vol. 34, No. 8, Aug. 2001, pp. 57-66.*

Neal Checka and Kevin Wilson, Person Tracking Using Audio-Video Sensor Fusion, MIT Artificial Intelligence Laboratory, USA.

D.M. Burraston, M.P. Hollier, M.O. Hawksford, Limitations of Dynamically Controlling the Listening Position, In a 3-D Ambisonic Environment, Mar. 22-25, 1997, Great Britain.

* cited by examiner

RELATED ART

DYNAMIC MEDIA RENDERING

BACKGROUND

Multi-channel audio and digital theatre in general is becoming more common. Digital media is more frequently being presented in places where many different viewers or listeners may come and go, where viewers and listeners move around, or where theatre or room configurations frequently change.

Figure 1:
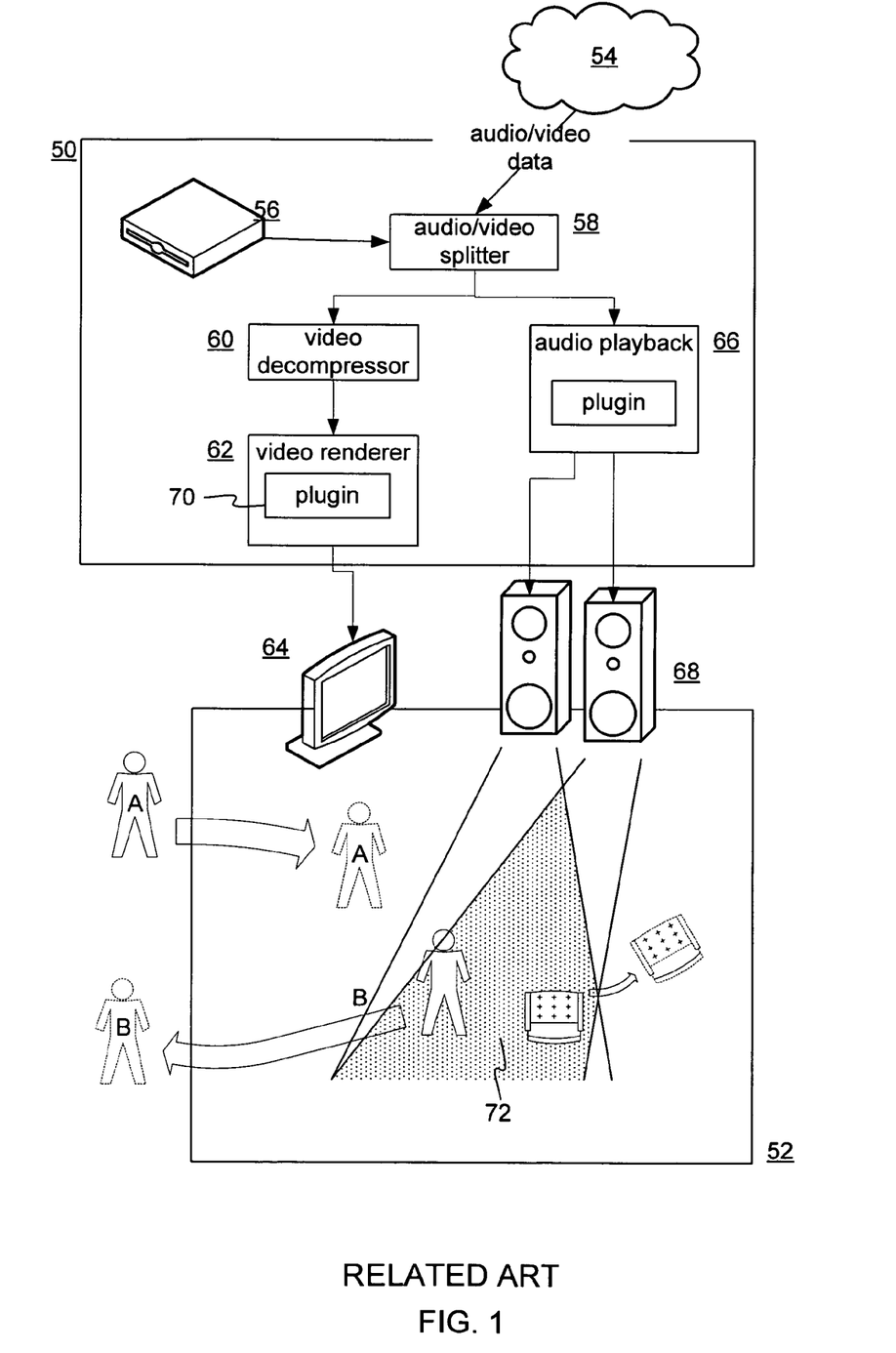
FIG. 1 shows a system rendering audio/video media in an area.

FIG. 1 shows a system 50 rendering audio/video media in an area 52. Area 52 may be a room, a region in a room, a home or public theatre, and so on. System 50 may be a computer, a set-top box, a satellite receiver, a gaming device, a personal video recorder, a DVD player, or any other type of device that renders, displays, projects, or transmits audio and/or video data. System 50 may receive audio/video data over a network 54, or it may play audio/video data from a local storage unit 56. The audio/video data may be in a format such as MPEG-2 format, WMV, or WMV-HD, or any other form of stored, streaming, or broadcast media.

Media devices may render media in a variety of ways. For example, system 50 has a splitter 58 that parses or splits audio/video content into two streams; a compressed video stream and an audio stream. A video decompressor 60 decompresses the video stream and passes it to a video renderer 62 that generates frames to display on display 64. An audio playback device or module 66 generates an audio signal played by speakers 68. Playback module 66 and video renderer 62 may be devices such as video cards, audio cards, or other forms of hardware. They may also be realized with software. Plug-ins 70 can be included to provide added or necessary media rendering functionality. Spatial or temporal video filters and audio special effects filters are examples of rendering plug-ins.

Of interest in FIG. 1 is 'audio sweet' spot 72. An audio sweet spot is a region or position within a listening area where the audio content will have the highest quality, that is, where the audio will have the optimal sound or where the audio will most realistically and accurately reproduce the effect, image or spatial data that is implied or intended from the author of source of the audio content. Due to the physics of unprocessed audio propagation in air, which is dependent upon the frequency content and phase relationships of the source material, most audio rendering systems have an audio 'sweet spot' where the projections of speakers intersect. For example, in a stereo system with two speakers, the sweet spot is centered where the speakers' axes of projection (an axis perpendicular to the face of a speaker) intersect. The sweet spot occurs similarly in 5.1 sound systems, 7.1 sound systems, and other surround sound systems. Different systems may have different audio sweet spot sizes and locations, and the definition of a sweet spot may be somewhat subjective, however most audio production systems have a sweet spot and a listener's experience may depend on their location relative thereto.

The dynamic nature of an audience or a listening area can present some problems when rendering sound or video. As shown in FIG. 1, different persons may enter or leave area 52. Persons may move around from one chair to another. Furniture may move from one location to another. However, the audio or video will not intelligently and dynamically adjust itself to the listener's or viewer's new position, perhaps due to lack of sensing or detection equipment or mechanisms or limitations thereof. Persons and/or furniture may be relocated outside the audio sweet-spot of nearby stationary speakers.

As different people enter or leave a media presentation area such as area 52, the people may in turn have to adjust audio and/or video volume, intensity, balance, equalization, or other digital signal processing settings on the rendering device(s) to match their own personal preferences or the limitations of their senses. For example, one person may enter a home theatre and tune the hue of the display or projector. If that person leaves and another person enters, that person may need to readjust the audio and/or video settings to match their own physiology and perception. As another example, a person with sensitive hearing may enter a video presentation exhibit at a museum and may have to adjust the volume of the exhibit to avoid discomfort.

In sum, audio and/or video output has been statically presented and has not often been optimized dynamically to take into account observable real-world conditions and occurrences.

SUMMARY

This Summary is included only to introduce some concepts discussed in the Detailed Description below. This Summary is not comprehensive and is not intended to delineate the scope of protectable subject matter.

Media may be dynamically rendered by receiving signals from one or more types of sensors sensing in an area, and obtaining from the signals information about one or more locations of furniture, or one or more locations of persons or heads or ears thereof, or identities of one or more persons. Audio and/or video data may be rendered based on the locations or identities. The identity of a person can be automatically obtained and used to automatically select a rendering profile which is then used to render digital audio and/or video media. A dynamically changing spatial location of a head, heads and/or or ears may be automatically determined and how an audio stream is rendered may be dynamically changed based on knowledge of the spatial location.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

Multi-Sensor Driven Rendering

Figure 2:
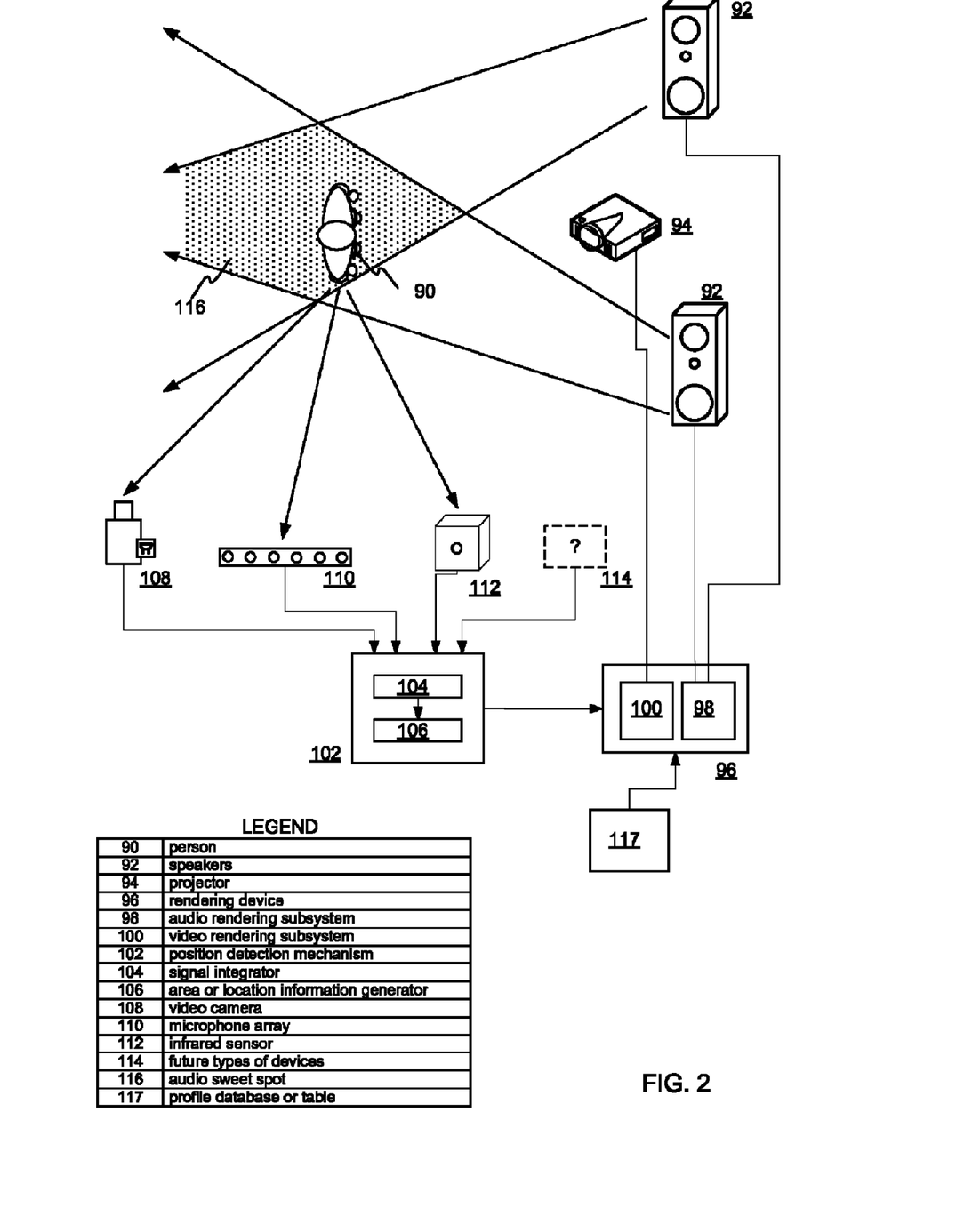
FIG. 2 shows a system for rendering audio and/or video data based on feedback or observations of multiple sensors.

FIG. 2 shows a system for rendering audio and/or video data based on feedback or observations of multiple sensors. A person 90 is listening to audio from speakers 92 and/or viewing video from a display or projector 94. The speakers 92 and projector 94 output audio and video provided by a media rendering device 96, such as a software media player, a set-top box, a general-purpose media device, a gaming device, a DVD player, etc. Rendering device 96 has an audio rendering subsystem 98 and a video rendering subsystem 100. The media rendering device 96 may have components somewhat similar to system 50 in FIG. 1. However, rendering device 96 receives area information from a position detection mechanism 102.

The position detection mechanism 102 may be separate from or incorporated within the media rendering device 96 (or possibly incorporated in the speakers 92 and/or display or projector 94) and has a digital signal processor and integrator 104 and an area or location information generator 106. The signal integrator 104 receives signals from a variety of different types of sensors such as a video camera 108, a microphone array 110, an infrared sensor 112, or even future types of devices 114. Other devices not shown may also be used. For example, stereoscopic cameras, high frequency audio detectors, radio frequency identifier (RFID) tag sensors, motion sensors, triangulated sound sensors, heat or pressure sensors in furniture where people sit, can all provide information about the locations of people and/or furniture. In the case of sound sensors such as microphones, a baseline signal akin to a test pattern may be emitted and its signature in an unoccupied area captured by microphone for later use in detecting locations of persons and/or objects.

Two or more different types of sensors are desirable for several reasons. Combining sensors can increase measurement accuracy. For example, a video camera signal may be supplemented with a microphone signal. Using the signals of different types of sensors generally involves digital signal processing. Combining sensor types for improved acuity is known and details for implementing the same may be readily found elsewhere. For example, see "Person Tracking Using Audio-Video Sensor Fusion", by Neal Checka and Kevin Wilson, MIT. See also "Audio-Video Sensor Fusion with Probabilistic Graphical Models", by Matthew J. Beal, Hagai Attias, and Nebojsa Jojic, Microsoft Research. There may be cases where a single physical sensor is used in multiple 'modes' to simulate multiple sensors, even though only one device is being used to do multiple measurements. For example a speaker may be used to emit high frequency signals in multiple bands over multiple iterative passes with different source content that may help refine more exact location information than if a single measurement technique had been used.

Use of different types of sensors is also advantageous because multiple types of sensors make it possible to sense object locations under different conditions. For example, a room darkened for viewing may not have sufficient light for video camera 108, whereas microphone array 110, although possibly less accurate, may nonetheless have sufficient acuity for rough object placement. A room may become noisy with discussion or certain audio sequences which may cause audio detection to become inaccurate. Audio and video sensors are also useful for providing different types of area information.

In sum, the system in FIG. 2 has different types of sensors 108, 110, 112, 114, etc. The system has a position detection mechanism that can output positional information, in particular the location of furniture and/or persons (or heads or ears) such as subject 90, based on the outputs of the sensors 108, 110, 112, 114. The system has audio and video renderers 98, 100, which can render audio and/or video according to the positional information. Thus, the system is capable of dynamically changing the way it renders media based on the changing locations of objects within the area where video is displayed or audio is played. More specifically, audio can be rendered such that audio sweet spot 116 moves or resizes according to where the listeners are. Video also can be rendered according to user locations. For example, the size of a video display area, whether projected or otherwise, can be adjusted according to where people are located. For example, if a viewer is close to a screen the display area may be reduced, or if most viewers are distant from a screen or display, the display area can be increased, perhaps with some compromise in quality, to provide a better average view.

The system may also have a user profile database or table 117 of user profiles indicating individual rendering preferences. Profile database or table 117 is discussed later with reference to FIGS. 4 and 5. Although for this embodiment multiple sensors are desirable, other embodiments discussed herein do not require multiple sensors or multiple types of sensors.

Figure 3:
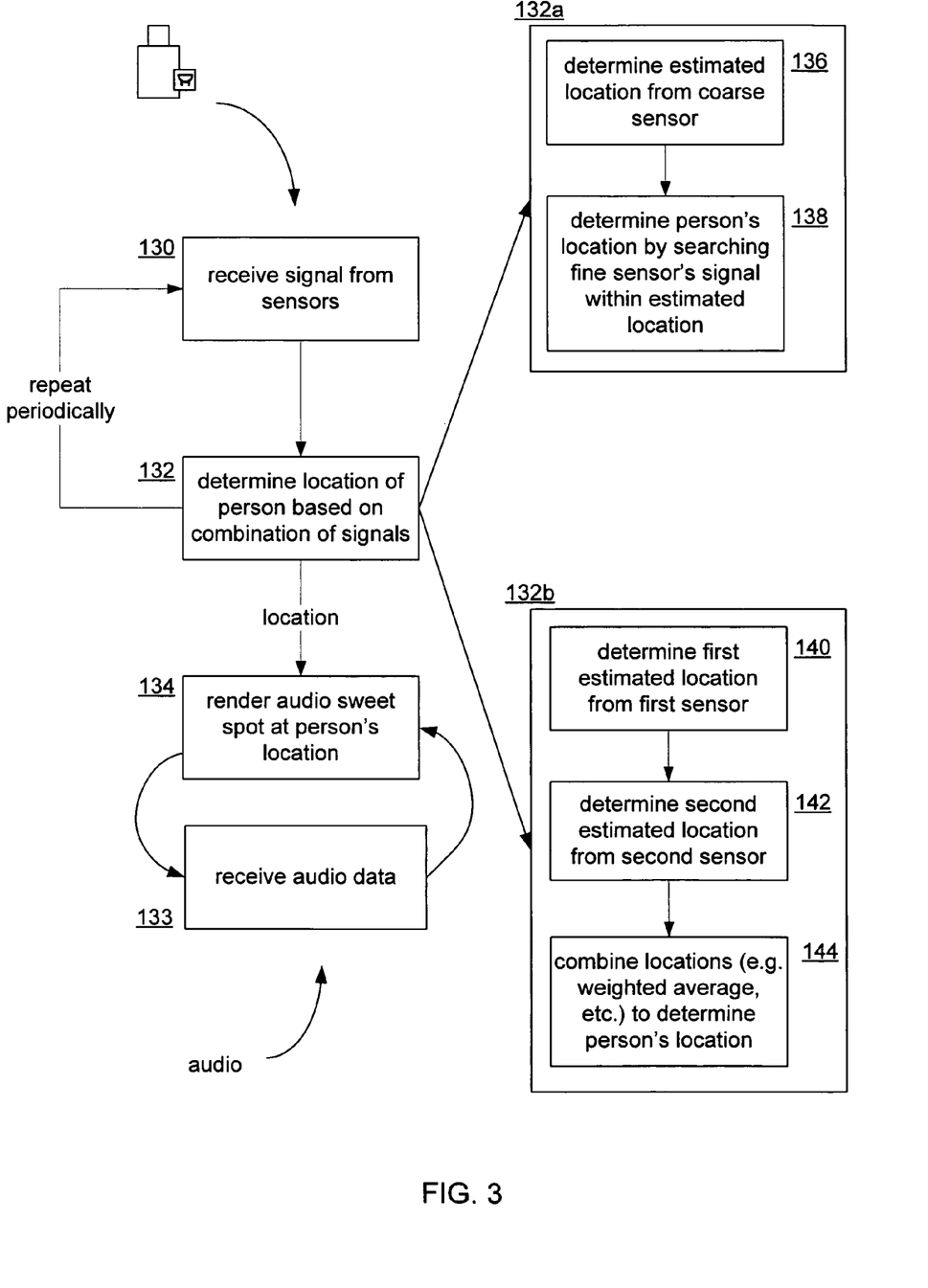
FIG. 3 shows a process for location-sensitive audio rendering.

FIG. 3 shows a process for location-sensitive audio rendering. The process in FIG. 3 may be performed with a system as shown in FIG. 2. At the beginning of a sensing/rendering loop, signals are received 130 by position detection mechanism 102, which integrates or fuses the signals to determine 132 the location or position of any person(s) in the sensing field. In the meantime audio data is received 133 for rendering. The received 133 audio signal is rendered 134 such that its sweet spot falls on or corresponds to the determined 132 listener locations. The receiving 130 of sensor signals and determining 132 locations is repeated as needed and location information is passed to the rendering 134 stage. The rendering 134 of audio data and receiving 133 new audio data is repeated.

Note that the 130-132 sensing loop and the 133-134 rendering loop need not be synchronized and need not occur on a 1-to-1 basis. For instance, the 130-132 sensing loop may occur every 1 second, or every 60 seconds, or every 10 minutes, or on demand, or as triggered by a person, whereas the 133-134 rendering loop will repeat frequently enough to reproduce sound while rendering 134 based on the last known object or person locations. As a consequence of the sensory feedback in steps 130 to 134, if a person in the sensing field moves, the multi-sensor determined 132 location changes to reflect the movement of that person.

Techniques for rendering 134 to control the audio sweet spot are known and detailed explanation thereof may readily be found from various sources. Generally, though, a digital signal processing (DSP) algorithm changes the phase and amplitude components of the received 133 audio signal so as to optimize the audio rendering for the specific location(s) of the listener(s). Phase and amplitude components of the original audio source are optimized for a specific locale using known or future algorithms that, for example, alter the perceived coherence and frequency of the audio stream being rendered. The locations of walls, furniture, or other sound-reflecting structure can also be taken into account to steer and improve the accuracy and quality of the sweet spot. If multiple persons are detected, specialized DSP algorithms can be applied to widen the range of the sweet spot so that the overall frequency spread is increased to cover a wider listening area, which will lower the quality at individual locations but will increase the overall average quality over a wider area. Variations targeted to head, ear, and/or furniture locations are discussed later.

A media framework such as DirectShow can be used to facilitate customized audio and video rendering. DirectShow is a media-streaming architecture for the Microsoft Windows platform that enables high-quality playback of multimedia streams. Streams can contain video and audio data compressed in a variety of formats, including MPEG, AVI, MPEG-1 Layer 3 (MP3), and WAV. Furthermore, DirectShow automatically uses any available video or audio acceleration hardware. With DirectShow it is possible to perform basic playback and format conversion while at the same time providing access to stream control architecture to allow customization. DirectShow components or "filters" (similar to plug-ins 70) can be added to support rendering effects discussed herein. Applications such as DVD players and MP3 players can be written using DirectShow. DirectShow also provides media parameters—APIs that support run-time changes to an object's properties. This can be used to implement user profile rendering parameters as discussed later. Other frameworks may be used, such as Media Foundation, also by Microsoft.

Several techniques may be used to determine 132 locations. A first technique 132a is to determine 136 an estimated rough location from a coarse sensor such as an infrared sensor. Then, a person's location is determined 138 by searching or processing the estimated location of the signal of a sensor with greater acuity. Alternatively, technique 132b may be used, which involves determining 140 a first estimated location from a first sensor, determining 142 a second estimated location from a second sensor, and then combining 144 the estimated locations. Combining 144 may be done using weighted averages, probabilistic analysis, etc. Other techniques may be used.

A process similar to that shown in FIG. 3 can be used to dynamically alter the rendering of video data according to last known or current positions of objects or persons. Video rather than audio data is received and rendered. A number of known or future techniques may be used to change the brightness (e.g., reduce when viewer is close to display), the resolution (reduce when viewer is distant), power savings (blank the screen when viewers are not present), the display size, such as basic resealing, aperture adjustment, or even automatic rearranging lenses using a zoom signal via RS-232, USB, wireless, etc.

Rendering Profiles

There can be problems when rendering media in public areas or other places where different users are expected to enter and exit an area over time. The following embodiment dynamically adjusts how audio or video is rendered so that users don't have to continually readjust rendering settings. If one person enters an area settings may be dynamically adjusted to suit the particular user. If that person leaves or another enters, further adjustments are automatically made. As discussed below, these adjustments can be made by storing rendering profiles in the profile database or table 117 and loading the profiles as needed.

Figure 4:
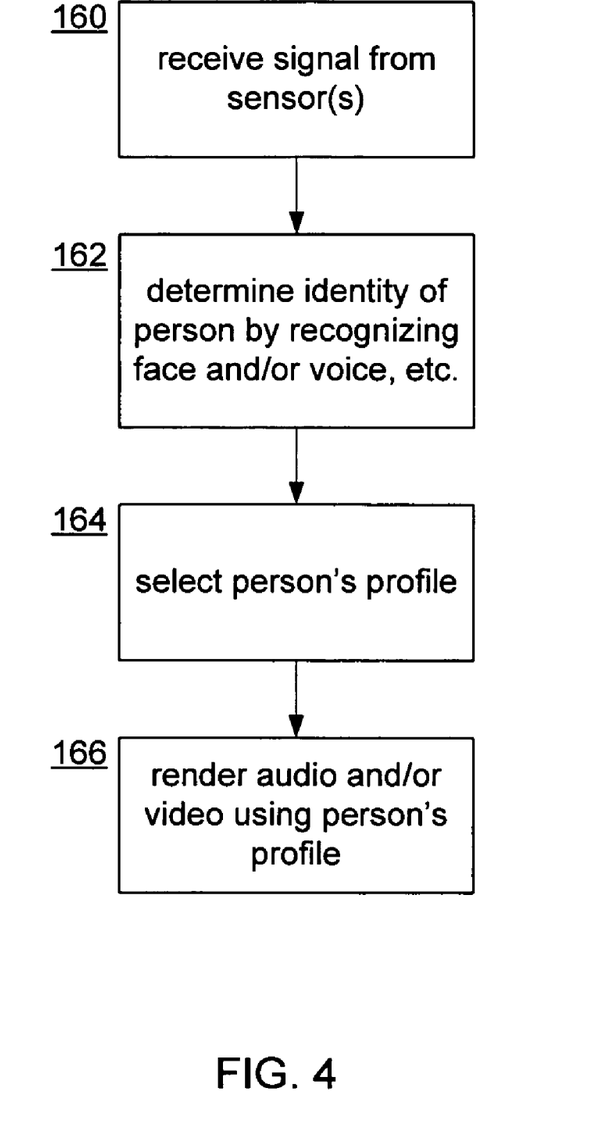
FIG. 4 shows a process for rendering audio and/or video according to a user profile.

FIG. 4 shows a process for rendering audio and/or video according to a user profile. In this embodiment, the identities of one or more persons are used to drive media rendering. A rendering system, perhaps with only one sensor or one sensor type, receives 160 signal(s) from one or more sensors sensing objects or people in a sensing field. Using any number of known techniques such as face recognition, voice recognition, RFID tags, or a combination thereof, the identity of a person is determined 162. A profile associated with that identified person is then selected 164. The selected 164 profile is then used to render 166 audio and/or video.

Figure 5:
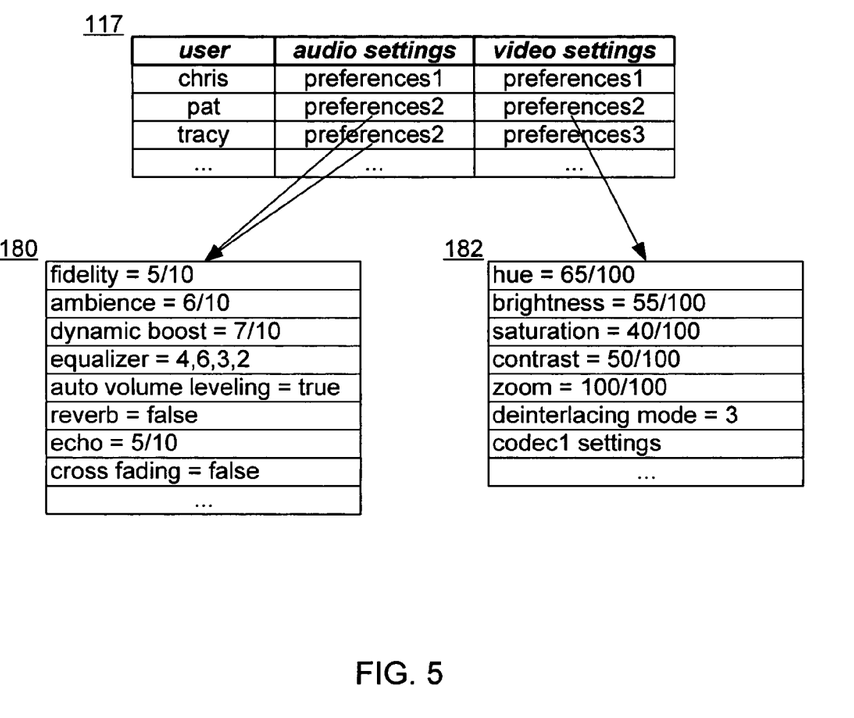
FIG. 5 shows an example of a rendering profile database or table.

FIG. 5 shows an example of the rendering profile database or table 117. Various user identities have associated with them audio and/or video parameters or settings. An example of an audio profile 180 is shown in FIG. 5. The types of settings are not limited to those shown; any parameter affecting sound quality can be used, such as volume or loudness or special audio effects. An example of a video profile 182 is also shown in FIG. 5. Again, the parameters shown are only examples and any video rendering parameter may be stored in video profile 182. For example, a parental control parameter may be used to shield children from inappropriate video or audio content. It may also be useful to indicate a preferred viewing aspect ratio, such as 16:9 or 4:3, etc. Note that different users may be associated with a same profile.

When multiple persons are in a media presentation or projection area it may be desirable to implement a mechanism for profile conflict resolution. A priority-based selection mechanism may be used where if multiple persons are present the profile of a person with a higher priority is used. Priority may be more granular where different parameters have different priorities, thus allowing one person to override volume, for example, without changing other settings. A blending strategy may be used where profile parameters are combined or averaged. Or, the profile of the first entrant may be used until that person leaves the area. In addition, the profiles may be selected and stored in order of first come, first serve, stored sequentially. Or, the list of all profiles that have ever been used may be stored, then recalled in a list or selection mechanism so that users may select which profile they wish to apply to the presentation space in a way that is associated either with the person who created the profile, or some other attribute used to define the settings such as "afternoon settings" versus "evening settings" where the evening settings may be set with lower overall volume and higher audio "brightness" so that sound may not disturb others sleeping in another room near the projection area (for example.)

If there is a profile or parameter swap a smooth or gradual transition between parameter values will avoid abrupt audio or video changes. For example, if a current profile has a loudness setting of $5/10$ and a new profile has a loudness setting of $2/10$, then the loudness is gradually lowered from $5/10$ to $2/10$ when the new profile is swapped in. If there is a change in contrast, the contrast can be gradually changed or swept from one contrast setting to another. So users do not think that there is a problem, it may be desirable to play or display a message to the effect that settings are being automatically changed.

Different Locational Bases

User locations discussed above may be determined using a number of different bases. Any combination of head location, ear location, and/or furniture location may be used to drive the parameters that control, for example the quality, equalization, spatialization, brightness, or other attributes of the audio or video rendering.

Figure 6:
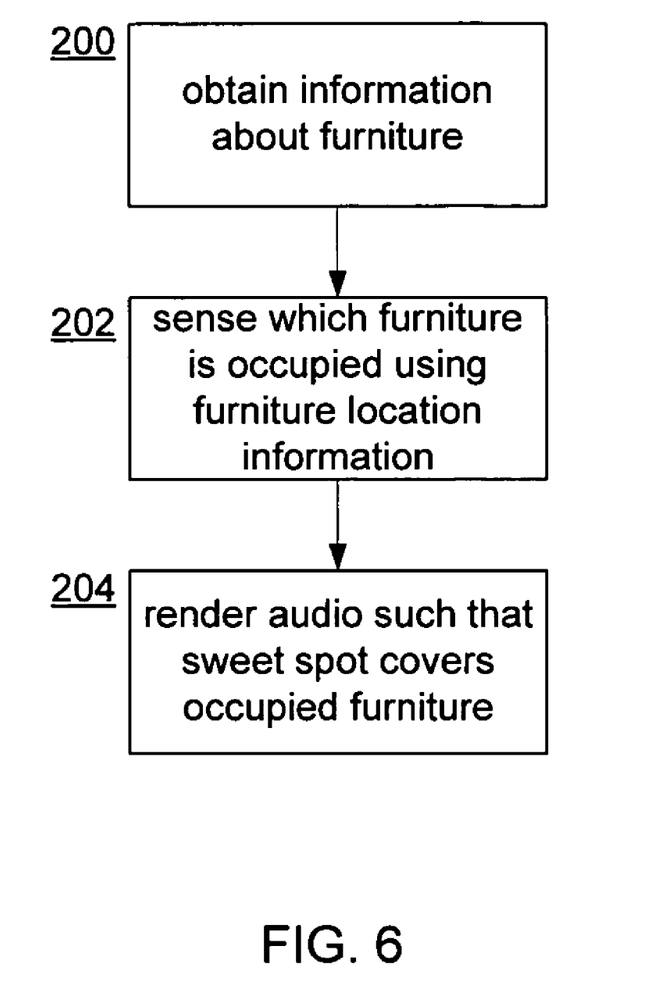
FIG. 6 shows a process for rendering audio based on furniture location information.

FIG. 6 shows a process for rendering audio based on furniture location information. Information about the locations of furniture is obtained 200 using one or more sensors as discussed above. The furniture location information is then stored and used as supplementary input when determining 132 the location of persons, as in FIG. 3. More specifically, when determining 132 the location of persons the sensing and rendering system analyzes sensory information constrained to or conditioned by the furniture information to determine which furniture is occupied. The audio is then rendered 204 such that the audio sweet spot covers the occupied furniture. By using a furniture-based setting, the room may be said to be optimized for the full potential range of audience that could occupy the seats in the room. While this may be less advantageous for any single person in one seat in the room, the overall average quality level for every seat in the room is optimized.

In another embodiment, the furniture locations may be the primary bases for locating the audio sweet spot. The audio sweet spot may be rendered to tightly cover most or all furniture locations regardless of whether the furniture is actually occupied.

Figure 7:
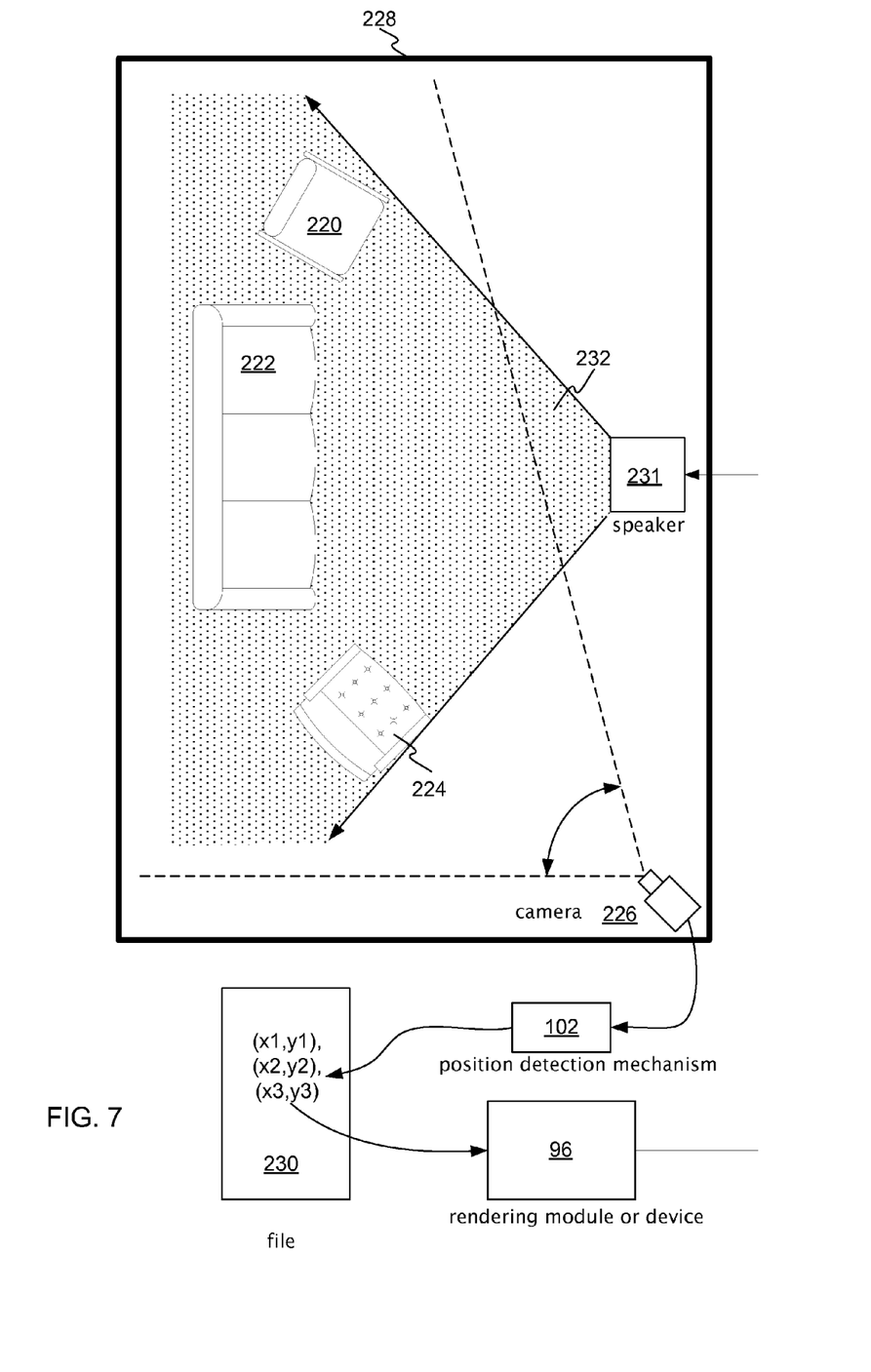
FIG. 7 shows how furniture locations may be gathered, stored, and used for rendering.

FIG. 7 shows how furniture locations may be gathered, stored, and used for rendering. In the example arrangement shown in FIG. 7 there are 3 pieces of furniture 220, 222, and 224. A sensor such as camera 226 captures an image of area or room 228. The image is fed to position detection mechanism 102, which analyzes the image and outputs the furniture locations to a storage such as file 230. The pieces of furniture 220, 222, and 224 have positions of (x1, y1), (x2, y2), and (x3, y3), respectively. The rendering module or device 96 then uses the positions stored in file 230 to render audio and/or video according to the positions. In FIG. 7, audio for a speaker 231 is rendered such that its optimal sound area 232 covers the locations of the furniture 220, 222, and 224.

In another embodiment, the furniture itself may indicate to the system whether it is occupied by using pressure sensors much like those used in automobile seats to indicate whether a seat is occupied. Preferably furniture will report occupancy using radio transmission e.g., via blue-tooth or some other wireless protocol, however the specific mechanism for transmitting data back to the central intelligent rendering device for processing is not important. The renderer 96 then uses the stored furniture locations and occupancy information to optimize the rendering. Referring to FIG. 7, the renderer 96 may receive information indicating that only furniture 222 is occupied and then narrow the rendering of audio for speaker 230 so that the optimal area 232 covers the location of furniture 222. If a person sits in furniture 220 then the renderer 96 will adjust and render the optimal area 232 to cover furniture 222 and 220.

As discussed above, video may be dynamically rendered in a manner similar to audio rendering discussed above. The dynamic information that drives the video rendering is essentially the same as in the case of audio rendering, but video is dynamically rendered in a way that optimizes video the signal for the given room setting rather than audio.

Figure 8:
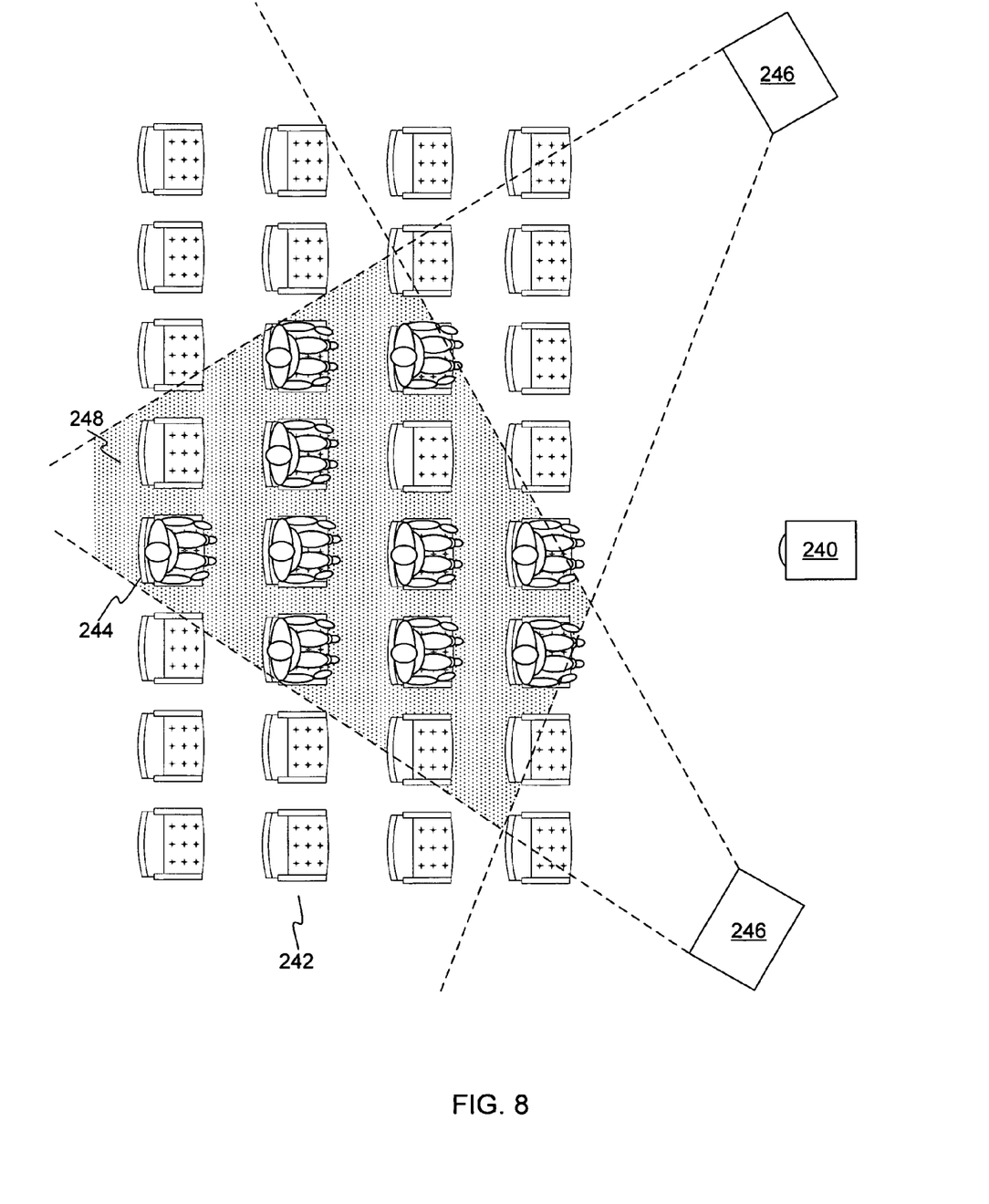
FIG. 8 shows an embodiment for rendering audio.

FIG. 8 shows an embodiment for rendering audio. In FIG. 8, an infrared sensor 240 senses the locations of persons in a theatre-like setting. Other sensing means may be used. The infrared sensor 240 may have a low locational acuity. Therefore, the information provided by the infrared sensor 240 is supplemented with predetermined information about locations of seats 242. Seat location information may be entered by hand or may come from a layout template associated with the theatre. The seat locations and the infrared signal are both used to determine which seats or locations have occupants 244. Audio is rendered such that speakers 246 produce a sweet spot 248 that covers occupied seats 242.

Embodiments discussed above key on locations of persons and/or furniture. However, it may be desirable for rendering to key on actual head and/or ear locations, particularly for highly fidelity audio systems. Furthermore, human hearing is very sensitive to the difference in time that it takes for sound to reach one ear versus the other ear. In systems where multiple microphones are used to capture sound for accurate reproduction, sound is reproduced to mimic the timing of sound arrival at the ears. By detecting the locations of ears it is possible to more accurately reproduce original ear timings. Whether such reproduction is possible or not, ear locations can provide a finer sweet spot. Some high fidelity audio systems have extremely narrow sweet spots. By rendering to ear locations the listener is more likely to enjoy the benefit of the audio sweet spot. The same reasoning applies to head locations.

Figure 9:
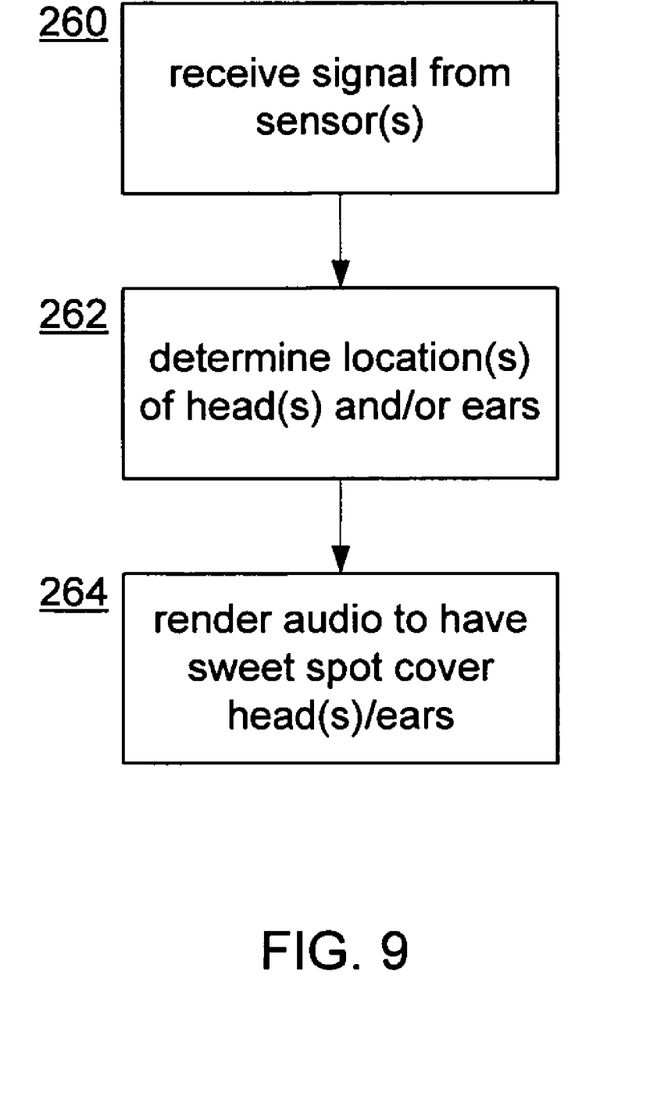
FIGS. 9 and 10 show rendering media according to head and/or ear locations.

FIG. 9 shows a process for rendering media according to head and/or ear locations. Signals are received 260 from a stereoscopic camera or one or more cameras. Known image processing algorithms are used to extract or determine 262 ear locations. Locations of ears, including obscured ears, can be determined 262 by triangulating using other points of reference such as the location of a visible ear, a nose location, a chin location, an eye location, etc. General or coarse detection such as sound or infrared may locate the general position of a person. This information can be used to optimize a search for head orientations. Algorithms designed for facial recognition can be used to detect 3D ear locations. The ear locations are used to optimize rendering 264 of the audio such that the sweet spot covers the ears or the sound reaches the ears with a timing that matches the originally captured sound that is being reproduced. The same process may be used with head locations.

Figure 10:
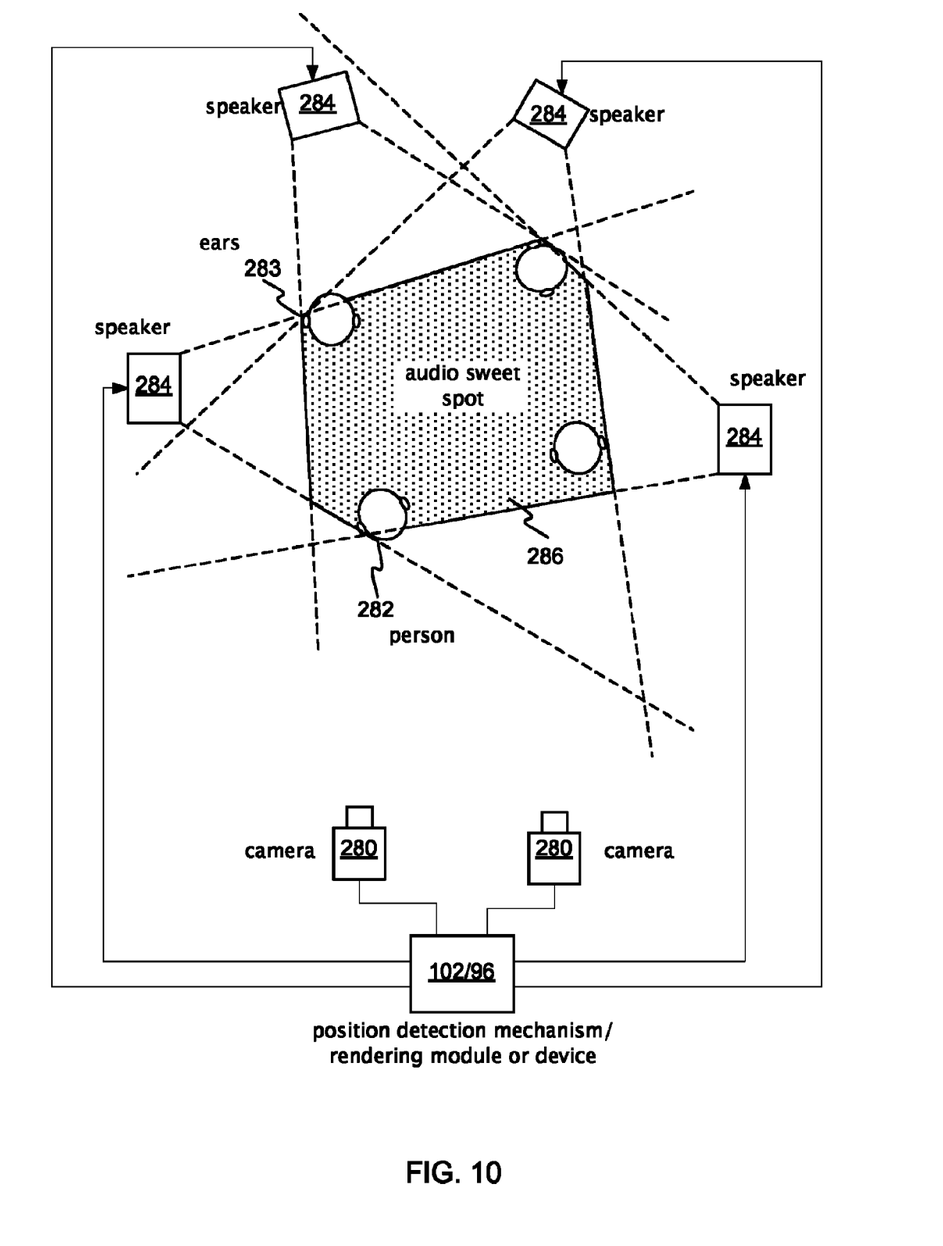

FIG. 10 shows audio rendering based on ear and/or head locations. Cameras 280 (or a single stereoscopic camera) capture an image of persons 282. The images are processed to determine the locations of the various ears 283 in the area. The ear locations are used by analyzer/renderer 102/96 to render audio through speakers 284 so that the audio sweet spot 286 is as small as possible yet it covers the ears of the persons 282 listening to the thus rendered audio.

In another embodiment, face recognition algorithms can be used to categorize the expressions on a person's face. The audio source can be selected accordingly. For example, the system can see a person's face, analyze it, determine that the person is angry, surprised, worried, happy, etc., and select specific media content or rendering attributes pre-associated with the detected state, mood, or emotion.

SUMMARY

The discussion above relates to various aspects of detecting changing objects and dynamically rendering media based thereon. It will be appreciated to ordinary artisans that variations of the ideas described above may fall within the ambit of the claims below.

Regarding implementation of ideas described above, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Furthermore, those skilled in the art will also appreciate that no further explanation is needed for embodiments discussed to be implemented on devices other than computers. Devices such as appliances, televisions, portable media players, or any device for playing sound or displaying video can be readily designed with features described above.

All of the embodiments and features discussed above can be realized in the form of information stored in volatile or non-volatile computer readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

Those skilled in the art will also realize that a variety of well-known types of computing systems, networks, and hardware devices, such as workstations, personal computers, PDAs, mobile devices, embedded processor-based devices, embedded computing devices, portable communications devices, and so on, may be used to implement embodiments discussed herein. Such systems and their typical components including CPUs, memory, storage devices, network interfaces, operating systems, application programs, etc. are well known and detailed description thereof is unnecessary and omitted.

The invention claimed is:

1. A method of dynamically rendering media with a device, the method comprising:
   receiving or sampling signals from one or more sensors sensing in an area;
   processing the signals to determine that objects in the area are pieces of furniture, and to obtain locations of the pieces of furniture, wherein the locations of the pieces of furniture are determined by sensing the pieces of furniture independent of whether they are occupied; and
   using an audio rendering process, which allows steering of an audio sweet spot in the area, to render audio data based on the locations of the pieces of furniture, wherein the audio sweet spot is steered to cover an area defined by one or more of the obtained locations of the pieces of the furniture determined to be occupied, the steering comprising repeatedly: automatically determining which of the pieces of furniture are currently occupied and automatically adapting the sweet spot to include an area defined by the locations of the occupied pieces of furniture.

2. A method according to claim 1, wherein the signals are received from at least a microphone array and a camera.

3. A method according to claim 1, wherein a signal from one sensor is used to refine a search of a signal from another sensor.

4. A method according to claim 1, further comprising combining profiles of two identified persons, respectively, and using the combination of the profiles to perform the video and audio rendering, the combining comprising selecting rendering parameters from a first profile, selecting rendering parameters from a second profile, and forming a third profile with the selected parameters.

5. A method according to claim 4, wherein the combination of the profiles comprises a plurality of rendering parameters, values of which are provided from both of the user profiles.

6. A method of dynamically rendering an audio stream, the method comprising:
   in an environment having a plurality of pieces of furniture, automatically determining that objects in the environment are pieces of furniture, automatically determining locations of the pieces of furniture, and repeatedly automatically determining which pieces of furniture are currently occupied and which pieces are currently unoccupied; and
   rendering the audio stream to cause a sweet spot of the rendered audio stream to dynamically adapt to fit the locations of the pieces of furniture determined to be currently occupied, and during the rendering, when an occupancy/unoccupancy state of a piece of furniture is determined to have changed, automatically changing how the audio stream is rendered to cause the sweet spot to adapt according to the location and occupancy/unoccupancy state of the piece of furniture, wherein when a piece of furniture becomes occupied, the sweet spot is dynamically adapted to encompass the piece of furniture, and when a piece of furniture becomes unoccupied, the sweet spot is dynamically adapted to fit the remaining pieces of occupied furniture.

7. A method according to claim 6, wherein means for sensing provides a signal upon which the determining is based.

8. A method according to claim 6, wherein the determining the pieces of furniture currently occupied is based on location information about furniture.

9. One or more computer readable storage media storing information to enable a computing device to perform a process, the process comprising:
   in an environment having a plurality of pieces of furniture, automatically determining that objects in the environment are pieces of furniture, automatically determining locations of the pieces of furniture, and repeatedly automatically determining which pieces of furniture are currently occupied and which pieces are currently unoccupied; and
   rendering an audio stream to cause a sweet spot of the rendered audio stream to dynamically adapt to fit the locations of the pieces of furniture determined to be currently occupied, and during the rendering, when an occupancy/unoccupancy state of a piece of furniture is determined to have changed, automatically changing how the audio stream is rendered to cause the sweet spot to adapt according to the location and occupancy/unoccupancy state of the piece of furniture, wherein when a piece of furniture becomes occupied, the sweet spot is dynamically adapted to encompass the piece of furniture, and when a piece of furniture becomes unoccupied, the sweet spot is dynamically adapted to fit the remaining pieces of occupied furniture.

* * * * *